(12) United States Patent
Olah et al.

(10) Patent No.: US 12,697,577 B2
(45) Date of Patent: Aug. 4, 2026

(54) AIR DRYER DEVICE AND AIR TREATMENT DEVICE

(71) Applicant: KNORR-BREMSE Systeme fuer Nutzfahrzeuge GmbH, Munich (DE)

(72) Inventors: Tibor Olah, Kecskemet (HU); Zoltan Laszlo Toth, Kiskunfelegyhaza (HU); Zoltan Tormasi, Kecskemet (HU); Peter Sajben, Helvecia (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 382 days.

(21) Appl. No.: 18/271,116

(22) PCT Filed: Dec. 27, 2021

(86) PCT No.: PCT/EP2021/087689
§ 371 (c)(1),
(2) Date: Jul. 6, 2023

(87) PCT Pub. No.: WO2022/156998
PCT Pub. Date: Jul. 28, 2022

(65) Prior Publication Data
US 2024/0050887 A1 Feb. 15, 2024

(30) Foreign Application Priority Data
Jan. 19, 2021 (EP) ..................................... 21152417

(51) Int. Cl.
*B01D 53/04* (2006.01)
*B01D 53/26* (2006.01)
*B60T 17/00* (2006.01)
(52) U.S. Cl.
CPC ..... *B01D 53/0446* (2013.01); *B01D 53/0415* (2013.01); *B01D 53/261* (2013.01);
(Continued)

(58) Field of Classification Search
CPC ................ B01D 53/04; B01D 53/0446; B01D 53/0415; B01D 53/0407; B01D 53/261;
(Continued)

(56) References Cited

U.S. PATENT DOCUMENTS 4,487,617 A * 12/1984 Dienes .................. B60T 17/004
96/136
4,673,419 A * 6/1987 Kojima ................ B01D 53/261
96/144
(Continued)

FOREIGN PATENT DOCUMENTS

CN 1806163 A 7/2006
CN 103657272 A 3/2014
(Continued)

OTHER PUBLICATIONS

Korean-language Office Action issued in Korean Application No. 10-2023-7027902 dated Dec. 18, 2024 with English translation (12 pages).
(Continued)

*Primary Examiner* — Frank M Lawrence, Jr.
(74) *Attorney, Agent, or Firm* — Crowell & Moring LLP

(57) ABSTRACT
An air dryer device for an air treatment device for a utility vehicle includes at least one housing forming at least one accommodation chamber for accommodating at least one desiccant container. The housing has at least one housing socket arranged, in a mounted state, at a bottom region of the housing; at least one first connection device and at least one second connection device, wherein the first and second connection device, via the desiccant container, are connectable during at least one load phase and/or during at least one regeneration phase of the air dryer device; at least one regeneration conduit for connecting the first connection device with the second connection device during the regeneration phase; and at least one first control valve arranged
(Continued)

and configured for opening or closing the regeneration conduit, especially wherein the first control valve is arranged at the housing socket.

13 Claims, 2 Drawing Sheets

(52) U.S. Cl.
CPC .................... *B01D 2257/80* (2013.01); *B01D 2259/40003* (2013.01); *B01D 2259/40086* (2013.01); *B01D 2259/4566* (2013.01); *B60T 17/004* (2013.01)

(58) Field of Classification Search
CPC ...... B01D 2257/80; B01D 2259/40003; B01D 2259/40086; B01D 2259/4566; B60T 17/004
USPC .............. 96/108, 147, 149; 34/80, 472, 473
See application file for complete search history.

(56) References Cited

U.S. PATENT DOCUMENTS

| | | | |
|---|---|---|---|
| 5,209,764 | A | 5/1993 | Eberling |
| 5,286,282 | A * | 2/1994 | Goodell ................ B60T 17/004 96/147 |
| 5,286,283 | A | 2/1994 | Goodell |
| 5,901,464 | A | 5/1999 | Kazakis et al. |
| 5,961,698 | A | 10/1999 | Dossaji et al. |
| 7,892,329 | B2 * | 2/2011 | Milomo ................ B60T 17/004 55/428 |
| 2003/0150330 | A1 * | 8/2003 | Hotta ..................... B01D 45/14 96/406 |
| 2006/0123743 | A1 * | 6/2006 | Heer .................... B01D 53/266 55/309 |
| 2007/0125231 | A1 | 6/2007 | Thomas et al. |
| 2008/0289505 | A1 | 11/2008 | Milomo |
| 2009/0193977 | A1 | 8/2009 | Hilberger |
| 2013/0036912 | A1 * | 2/2013 | Clair .................... B01D 53/261 96/118 |
| 2013/0206003 | A1 | 8/2013 | Hilberer |
| 2014/0260995 | A1 * | 9/2014 | Adams ............... B01D 46/0039 96/400 |
| 2018/0297572 | A1 * | 10/2018 | Reifinger ............. B01D 53/261 |
| 2024/0033678 | A1 * | 2/2024 | Olah ...................... B01D 27/08 |

FOREIGN PATENT DOCUMENTS

| | | |
|---|---|---|
| CN | 108025729 A | 5/2018 |
| DE | 32 08 561 A1 | 9/1983 |
| DE | 33 11 682 A1 | 10/1984 |
| DE | 692 10 614 T2 | 10/1996 |
| DE | 201 16 232 U1 | 1/2002 |
| DE | 10 2006 037 307 A1 | 2/2008 |
| EP | 0 993 117 A1 | 8/1999 |
| JP | 2013-525085 A | 6/2013 |
| KR | 10-2008-0011177 A | 1/2008 |
| KR | 10-0931263 B1 | 12/2009 |

OTHER PUBLICATIONS

International Search Report (PCT/ISA/210) issued in PCT Application No. PCT/EP2021/087689 dated May 3, 2022 (2 pages).
Written Opinion (PCT/ISA/237) issued in PCT Application No. PCT/EP2021/087689 dated May 3, 2022 (5 pages).
Extended European Search Report issued in European Application No. 21152417.8 dated Jul. 30, 2021 (7 pages).
Russian-language Office Action issued in Russian Application No. 2023121477/11(047062) dated Feb. 7, 2024 with English translation (10 pages).
Chinese-language Office Action issued in Chinese Application No. 202180091302.2 dated Dec. 19, 2025 with English translation (12 pages).
Hindi-language Examination Report issued in Indian Application No. 202337054869 dated Jun. 3, 2026 with English translation (7 pages).

* cited by examiner

AIR DRYER DEVICE AND AIR TREATMENT DEVICE

BACKGROUND AND SUMMARY

The present invention relates to an air dryer device for an air treatment device for a vehicle, especially a utility vehicle, with at least one housing forming at least one accommodation chamber for accommodating at least one desiccant container.

Further, the present invention relates to an air treatment device for a vehicle, especially a utility vehicle, with at least one air dryer device as mentioned above.

In the field of vehicles and especially utility vehicles, usually pneumatic systems are used for brakes, suspension and other auxiliary systems, and the distribution of the air is handled by a multi-circuit protection valve that can divide the air provided by a compressor or the like, handle the different opening and closing pressures and the pressure limitation of each circuits as well as the circuit protection.

Before the pressurized air may be controlled this way, an important measure is to dry this air (as it still contains humidity of the atmosphere) provided by the compressor. This drying procedure is established by an air dryer device being arranged between the compressor and the multi-circuit protection valve and providing dried and de-oiled air to the multi-circuit protection valve.

Such conventional air dryer devices are already known in the prior art.

DE 3208561 A1 shows an air-drying device having a connection housing on which a cap-shaped container is mounted, which accommodates a drying agent cartridge. For ease of changing the drying agent cartridge, a clamping bracket is used, which is swivellably mounted on the housing and can be swivelled over the container and fixed there.

DE 69210614 T2 discloses an air dryer control system in which the compressed air output of a compressor is dried by one of two air dryers connected in parallel. The purging and drying cycles of the air dryers are alternated by a timing and relay device.

EP 0933117 A1 discloses a shuttle valve for a gas drying system that cleans and dries a stream of unpurified pressurized gas received from a source thereof and supplied to a pneumatic system that uses such a purified pressurized air. The valve includes a housing that connects a drying assembly to a structure that conveys the unpurified pressurized air to the drying assembly.

U.S. Pat. No. 5,901,464 A relates to a twin tower air drying system for cleaning and drying a stream of unpurified pressurized air including a centrifugal separator having a baffle horizontally disposed therein to generally separate the centrifugal chamber into an upper sub-chamber and a lower sub-chamber; a pair of cavities each containing desiccant media and a purge tube with a flapper valve thereover to close and restrict flow of air through the purge tube when air is flowing upwardly through the cavity, and to open and promote air flow through the purge tube when air is flowing downwardly through the cavity.

U.S. Pat. No. 5,961,698 A discloses a twin tower gas drying system for cleaning and drying a stream of unpurified pressurized gas received from a source thereof for use of a pneumatic system. The drying system includes a manifold block provided with the plurality of ports. A separator and sump are connected to such a block and to one of the ports for initially separating moisture and particulates from such stream of unpurified gas, and for directing the remainder of the stream to the one port in the block.

Basically, the desiccant of all air dryer devices needs to be pretensioned as, during the lifetime of the desiccant, vibrations caused by the powertrain and by the operation of the vehicle generate wear and friction of the desiccant formed by multiple desiccant beads or balls staying in contact to each other. The mentioned vibrations cause friction, abrasion, wear, and powdering of the desiccant beads resulting in an overall volume loss of the desiccant (over a sufficient period of time) that has to be compensated by a tension or pressing force in order to generate stable desiccant conditions of the desiccant.

Further, the desiccant needs to be regenerated from time to time since the desiccant has a limited capability of absorbing water that has to be separated from the desiccant after its water saturation. During the regeneration phase, the air dryer device is flown by the regeneration air in an opposite flow direction compared to the load phase. Due to the general set up of such air dryer devices, often a control valve is used to control the regeneration process properly. But, according to the prior art this control valve needs a very big sealing surface resulting in a high effort of sealing materials, building space, costs and manufacturing efforts, but also a large number of parts.

It is therefore an object of the present invention to improve an air dryer device as mentioned above, in particular in that its regeneration phase is controlled more precisely and in that its operation and sealing properties are optimized.

This object is solved according to the present invention with an air dryer device according to the independent claims. Correspondingly, an air dryer device for an air treatment device for a vehicle, especially utility vehicle, is provided with at least one housing forming at least one accommodation chamber for accommodating at least one desiccant container; wherein the housing comprises at least one housing socket being arranged, in a mounted state, at a bottom region of the housing, and wherein the housing comprises at least one first connection device and at least one second connection device, wherein the first and second connection device, via the desiccant container, are connectable during at least one load phase and/or during at least one regeneration phase of the air dryer device; wherein the housing comprises at least one regeneration conduit device for connecting the first connection device with the second connection device during the regeneration phase; and wherein the housing comprises at least one first control valve being arranged and configured for opening or closing the regeneration conduit device, especially wherein the first control valve is arranged at the housing socket.

The invention is based on the basic idea that at least one control valve is provided, especially at the housing socket located at the bottom region of the housing, wherein the control valve is arranged and configured such that it may open or close the regeneration conduit device. Since the control valve is especially located at the housing socket, the required sealing contact area may be reduced significantly resulting in a reduced danger of leakage possibilities and also in a reduced amount of sealing materials for the control valve and the air dryer housing. Further, the assembly of the control valve may be automatized and a reduction of the assembly time is also established. Further, the backpressure of the air dryer device, in regeneration phase, could be setup more sensitively such that the lifetime of the components of the air dryer device is increased. The control valve arrangement at the bottom portion of the housing also simplifies the maintenance and mounting work as this region is very easily accessible during the pre-mounted state of the air dryer device. In this regard, the first control valve in general guarantees a fast, safe, and reliable exhausting of contaminations within the air dryer device like dirt particles, oil and/or water during the regeneration phase.

It is contemplated that the first control valve is formed by at least one first check valve. Check valves are fully developed valve types with a long lifetime guaranteeing a safe operation during the lifetime of the air dryer device. These valves are built up with very little parts and construction space such that they provide a control valve with a high power density allowing a good control of the back-pressure of the air dryer device during regeneration phase.

Additionally, the housing comprises at least one second check valve being arranged and configured for opening or closing the regeneration conduit device, especially wherein the second check valve is arranged at the housing socket. By providing two check valves, the back-pressure of the air dryer device, in regeneration phase, may be setup more precisely. This precise control of the regeneration phase increases the lifetime of the air dryer components on the one hand. On the other hand, two check valves increase the operation safety of the air dryer device as the desiccant must be regenerated after a certain lifetime that would be impossible with only one check valve that is out of function for example.

Also, the housing comprises at least one third check valve being arranged and configured for opening or closing the regeneration conduit device, especially wherein the third check valve is arranged at the housing socket. By providing three check valves, the back-pressure of the air dryer device, in regeneration phase, may be setup even more precisely. This very precise control of the regeneration phase additionally increases the lifetime of the air dryer components on the one hand compared to the solution with one or two check valves. On the other hand, three check valves increase the operation safety of the air dryer device since the desiccant needs to be regenerated after a certain lifetime due to saturation that would be impossible or made more difficult with one or even two check valves being out of function. Further, the number of three check valves may cover different built in angles of the air dryer device with respect to a pairing partner, as for example a housing of a multi-circuit protection device or an air treatment device in general. It is also conceivable that the housing comprises at least one fourth, fifth, or sixth check valve being arranged and configured for opening or closing the regeneration conduit device, especially wherein these check valves are arranged at the housing socket. In this regard, the three or more the check valves guarantee a very fast, safe, and reliable exhausting of contaminations within the air dryer device like dirt particles, oil and/or water during the regeneration. In case of less than three check valves (e.g. one or two check valves), the excess oil gathering at the housing socket may be guided by one or more inclined or sloped housing sections in order to guide the excess oil during the regeneration to the one or two check valves properly such that this oil may be discharged from the air dryer cartridge more efficiently. Thus, in case when three or more check valves are used, these one or more inclined or sloped housing sections are not necessary anymore such that the air dryer cartridge may be simplified in structural terms.

Moreover, the first check valve and/or the second check valve and/or the third check valve are arranged at the housing socket. As mentioned above, this arrangement of the check valve(s) at socket of the housing simplifies the maintenance work since the socket of the air dryer device is very easily accessible during the pre-mounted state of the air dryer device. Also, manufacturing efforts and costs may be reduced accordingly. These decreased manufacturing efforts may also be transferred to an automated manufacturing process of these check valves since the control effort may be decreased due to an easy accessibility of the check valve areas to be manufactured. By arranging these check valve(s) at the socket of the air dryer device, the back-pressure control may be established even more precisely.

Further, the first check valve, the second check valve, and the third check valve are radially symmetrically or radially asymmetrically arranged with regard to a longitudinal axis of the air dryer device. This arrangement simplifies the manufacturing efforts and costs since, due to the symmetrical arrangement, standardized working and manufacturing procedures may be implemented. These decreased manufacturing efforts may be also transferred to the automated manufacturing of these check valves since the control effort may be decreased as the symmetrical arrangement may be implemented easily within the control unit of these automated manufacturing devices. Further, the symmetrical arrangement reduces the mechanical tensions at the housing as the check valves, nevertheless, cause some mechanical tension concentrations that may be decreased by a symmetrical arrangement. Additionally, the possible different build in angles may also be arranged symmetrically resulting in a simplified assembling. In case of a radial asymmetrical arrangement, more advantageous freedoms in the design of the housing socket and/or the air dryer cartridge are possible.

On the other hand, the first check valve is formed by at least one valve housing portion of the housing and by at least one valve body of the first check valve. This set up is advantageous in this way, that little parts are needed. The valve housing portion is formed directly at the bottom of the housing such that it embodies only one part. The same appears with regard to the valve body, since the valve body is also established by just one part such that one whole check valve is provided only by two parts. Consequently, this design enables a very simple check valve arrangement with a very little danger or probability of a misfunction of these valves. In this regard, it is advantageous that the valve housing portion is integrally formed with the housing of the air dryer cartridge.

In addition, the valve body comprises at least one membrane portion with at least one radial sealing lip and/or comprises at least one axial sealing portion. Advantageously, the membrane portion has elastic properties. Thus, no further elastic element (like a spring) needs to be provided in order to retract the check valve into the open or closed state (depending on the setup of the check valve). A check valve with such a membrane solution thus is build up with very simply and with little parts. The membrane is established such that only a pressure gradient between the valve inlet and valve outlet controls the corresponding opening and closing state or position of the check valve without any control spring. Thus, a very simple check valve design is provided at all. Further, the membrane comprises a radial sealing lip that establishes an increased sealing area as it implies that the sealing face is at the outermost radial region of the membrane resulting in a better sealing performance. In addition, by virtue of the at least one axial sealing portion, also an axial sealing function of the valve body may be established very simple resulting in a highly integrated check valve. It is also conceivable that the axial sealing portion may be integrated into the radial sealing lip. Alternatively, the axial sealing portion is formed as an individual portion of the valve body.

Especially, the valve body comprises at least one elastically compressible and expandable fixing portion. This fixing portion simplifies the mounting process since no further mounting member (like a pin, threat, or bold) needs to be provided in order to fix the valve body to the housing portion of the air dryer device housing. This fixing portion also enables an automated assembly process of the valve body to the housing portion as the valve body merely needs to be pushed in the corresponding mounting space at the valve housing portion in order to establish its final set up. In other words, the valve body may be fixed to the valve housing portion by its own material forming a very simple and effective way of constitution of the check valve. In this regard the elastically compressible and expandable fixing portion may be formed as an elastic hollow pin. Additionally or alternatively, each valve body may be fixed together with a support of another part like a groove, shoulder or bore of the housing portion of the air dryer device housing.

Furthermore, the valve body is formed as an integral elastic, especially rubber, valve body. Elastic materials like rubber materials are very common according to the valve sealing technologies such that the provision of rubber consequently is advantageous also in the present case. Further, as already discussed above, the valve body needs so solve at least the following problems at once: sealing face, self-locking fixation, and self-opening and self-closing in answer to a pressure gradient. To meet these problems, rubber material is the most advantageous material choice since there are not many other alternative materials with comparable features for solving this problem combination. Rubber material is further a cheap material such that it is advantageous in the present case. Additionally or alternatively, each check valve body may include an elastic reinforcement element (for example a metallic reinforcement element) at which the rubber valve body is vulcanized on in order to guarantee a better fixing performance.

Moreover, the second check valve is formed in the same manner as the first check valve. This enables an even more simplified design and manufacture process of the air dryer device and the check valves. Accordingly, the technical teachings and advantages that have been discussed above with regard to the first check valve also apply with regard to the second check valve.

Besides, the third check valve is formed in the same manner as the first check valve. As mentioned above, this setup enables an even more simplified design and manufacture process of the air dryer device and the check valves. Accordingly, the technical teachings and advantages that have been discussed above with regard to the first check valve also apply with regard to the third check valve.

According to a further aspect of the invention, the air dryer device is formed as an air dryer cartridge. As the desiccant needs to be replaced after a certain lifetime that is shorter than the lifetime of the air treatment device to which the air dryer device is usually coupled. Air dryer cartridges are well known solutions for this problem, such that air dryer cartridges are also advantageous with regard to the present invention.

According to the invention, an air treatment device for a vehicle, especially utility vehicle, is equipped with at least one air dryer device as mentioned and discussed above. The advantages and technical teachings as discussed above with regard to the air dryer device, which is a sub-unit of the air treatment device, together with its embodiments are also transferable to the air treatment device and its embodiments.

Further details and advantages of the present invention shall now be disclosed in an embodiment according to the invention in connection with the drawings.

DETAILED DESCRIPTION OF THE DRAWINGS

Figure 1:
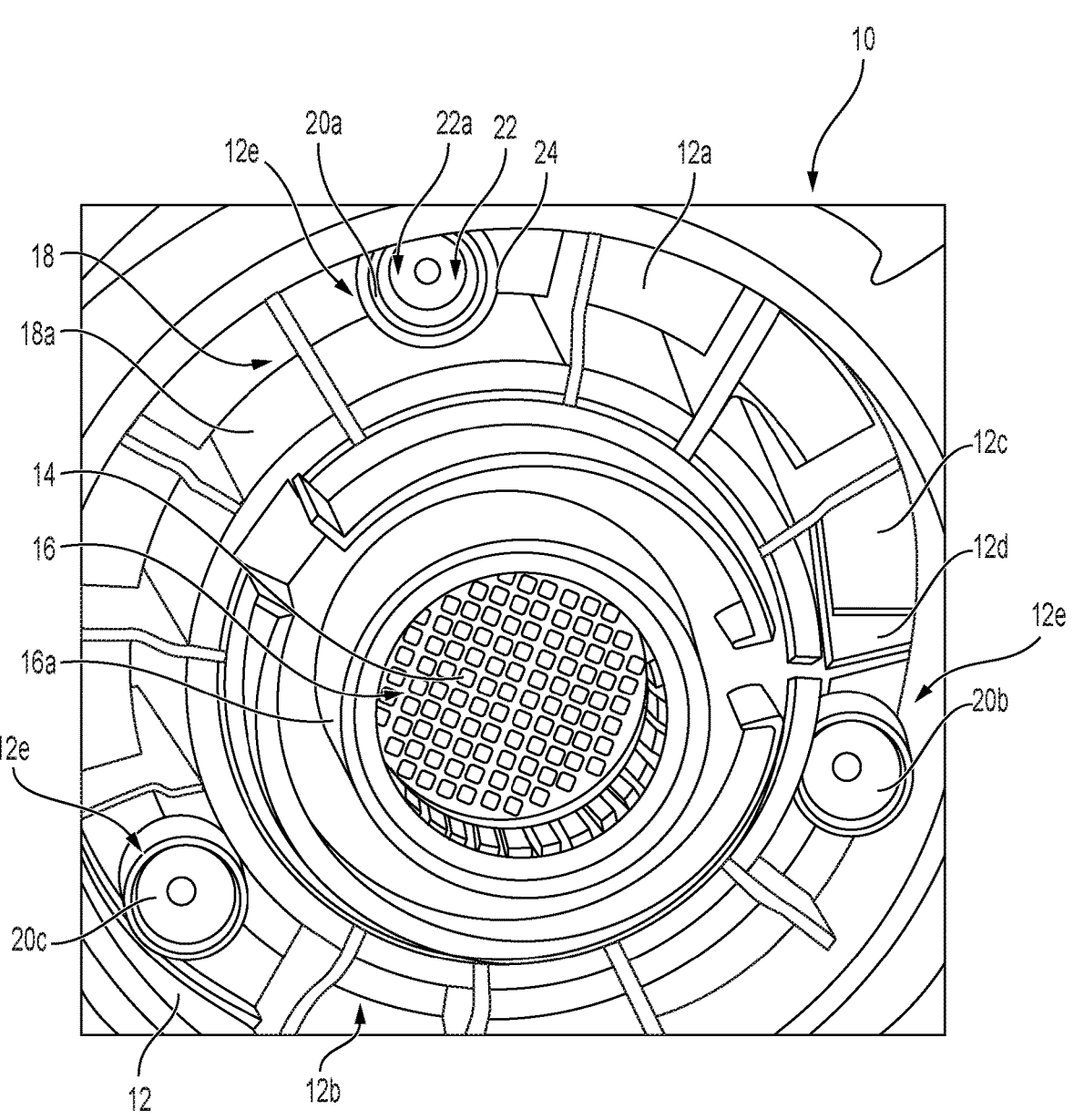
FIG. 1 is a schematic bottom view of an embodiment of an air dryer device according to the invention for an air treatment device of a vehicle.

FIG. 1 shows a schematic bottom view of an embodiment of an air dryer device 10 for an air treatment device for a utility vehicle (both not shown in FIG. 1).

The air dryer device 10 is formed as an air dryer cartridge.

The air dryer device 10 comprises a housing 12 forming an accommodation chamber for accommodating at least one desiccant container 14.

The housing 12 further comprises a housing socket 12a, which is arranged, in a mounted state, at a bottom region 12b of the housing 12.

The housing socket 12a comprises a circular housing plate 12c with a plurality of star-shaped and radially symmetrically orientated rip sections 12d with respect to a longitudinal axis of the air dryer housing 12.

According to FIG. 1, the housing socket 12a further comprises a first connection device 16 for connecting the air dryer device 10 to a compressor (not shown).

The housing socket 12a also comprises a second connection device 18 for connecting the air dryer device 10 to at least one control valve device.

The control valve device may be formed as a part of an air treatment device also comprising a multi circuit-protection valve device This control valve device may also be connected to the first connection device 16 in order to connect it to the compressor.

The first connection device 16 is formed by a central circular hollow cylinder 16a protruding from the housing socket 12a in a direction opposite to the desiccant container 14.

The second connection device 18 is formed by a corresponding housing connection portion 18a, radially arranged around the first connection device 16 which connects an annular space around the central circular hollow cylinder 16a with the desiccant container 14 via an annular load connection conduit (not shown) extending radially outwards with regard to the desiccant container 14.

Thus, the first and second connection device 16, 18, in the mounted state, are connectable to each other, via the desiccant container 14, during a load phase or during a regeneration phase of the air dryer device 10.

Additionally, the housing 12 comprises a regeneration conduit device 12e for connecting the first connection device 16 with the second connection device 18 during the regeneration phase.

The housing 12 also comprises a first control valve 20 formed as a check valve 20a for opening or closing the regeneration conduit device 12e.

According to FIG. 1, the first check valve 20a is arranged at the housing socket 12a.

The first check valve 20a is arranged at a region of the housing socket 12a where the regeneration conduit device 12e enters the housing socket 12a.

The regeneration conduit device 12e extends between the housing socket 12a and the desiccant container 14 for connecting the desiccant container 14 with the second connection device 18 during the regeneration phase.

According to FIG. 1, the housing 12 comprises a second check valve 20b for opening or closing the regeneration conduit device 12e.

Like the first check valve 20a, the second check valve 20b is arranged at the housing socket 12a as well.

The second check valve 20a is also arranged at a region of the housing socket 12a where the regeneration conduit device 12e enters the housing socket 12a.

Additionally, the housing 12 comprises a third check valve 20c for opening or closing the regeneration conduit device 12e.

Like the first and second check valves 20a, 20b, the third check valve 20c is arranged at the housing socket 12a as well.

The third check valve 20a is also arranged at a region of the housing socket 12a where the regeneration conduit device 12e enters the housing socket 12a.

It is also conceivable that more or less (e.g. two or even one check valve) than three check valves 20a, 20b, 20c (four, fixe, six, seven, eight etc.) may be arranged at the housing socket 12a according to the above-mentioned manner.

From what has been said before, it follows that the regeneration conduit device 12e comprises, according to FIG. 1, three regeneration conduit sections, each associated to one check valve 20a, 20b, 20c and each extending between the housing socket 12a and the desiccant container 14 for connecting the desiccant container 14 with the second connection device 18 during the regeneration phase.

Each regeneration conduit section enters the housing socket 12a at each region, where the first, second and third check valve 20a, 20b, 20c is arranged, respectively.

As can be further depicted from FIG. 1, the first check valve, the second check valve, and the third check valve 20a, 20b, 20c are radially symmetrically arranged with regard to a longitudinal axis of the air dryer device 10.

Alternatively, the first check valve, the second check valve, and the third check valve 20a, 20b, 20c may be arranged radially asymmetrically with regard to the longitudinal axis of the air dryer device 10.

The function of the air dryer device as mentioned above is as follows:

According to a load phase, pressurized air is supplied from an external compressor to the second connection device 18 and enters the second connection device 18 and flows then through the socket 12a.

The air then flows radially outwards of the desiccant container 14 to the top of the housing 12 where the pressurized air changes its flow direction in order to enter the desiccant container 14 at its top region.

In the mounted state, the air dryer device 10 is fixed on a control valve unit of an air treatment device for controlling the load and regeneration phases of the air dryer device 10.

This control unit comprises at least two ports or connections corresponding with the first and second connection device 16, 18 of the air dryer device 10.

To this end, a proper seal between these two connection devices 16, 18 is set up in order to avoid a direct flow path from the first to the second connection device 16, 18.

Consequently, the pressurized air then flows through the desiccant container 14 (for drying) and enters the first connection device 16 and then leaves the air dryer device 10 and flows into the control valve unit from where the pressurized air is transmitted to an multi circuit-protection valve for example.

According to a regeneration phase, the pressurized regeneration air flows according to an opposite manner according to the load phase.

Thus, pressurized regeneration air is supplied (e.g. from a regeneration container via the control valve unit) to the first connection device 16, enters it, and flows through the desiccant container 14 (for regeneration of the desiccant).

The air then leaves the desiccant container 14, enters the regeneration conduit device 12e and is then fed to the check valves 20a, 20b, 20c and pass through them as they were opened by the regeneration air, entering the second connection device 18 and flowing to the atmosphere afterwards.

According to the invention, the air treatment device for a utility vehicle as mentioned above with at least one air dryer device 10 is also provided.

The air treatment device is set up with the air dryer device 10, a control valve unit for controlling the operation of the air dryer unit (e.g. regeneration and load phases) and with a multi circuit-protection valve unit.

Other units or modules like a parking brake unit, a trailer control valve unit and/or service brake unit may also be integrated in the air treatment device.

The arrows and/or arrow parts according to FIG. 1 that are not associated with a reference sign do not have any contribution to the subject-matter of the air dryer device 10 and the air treatment device according to the present invention, respectively.

Figure 2:
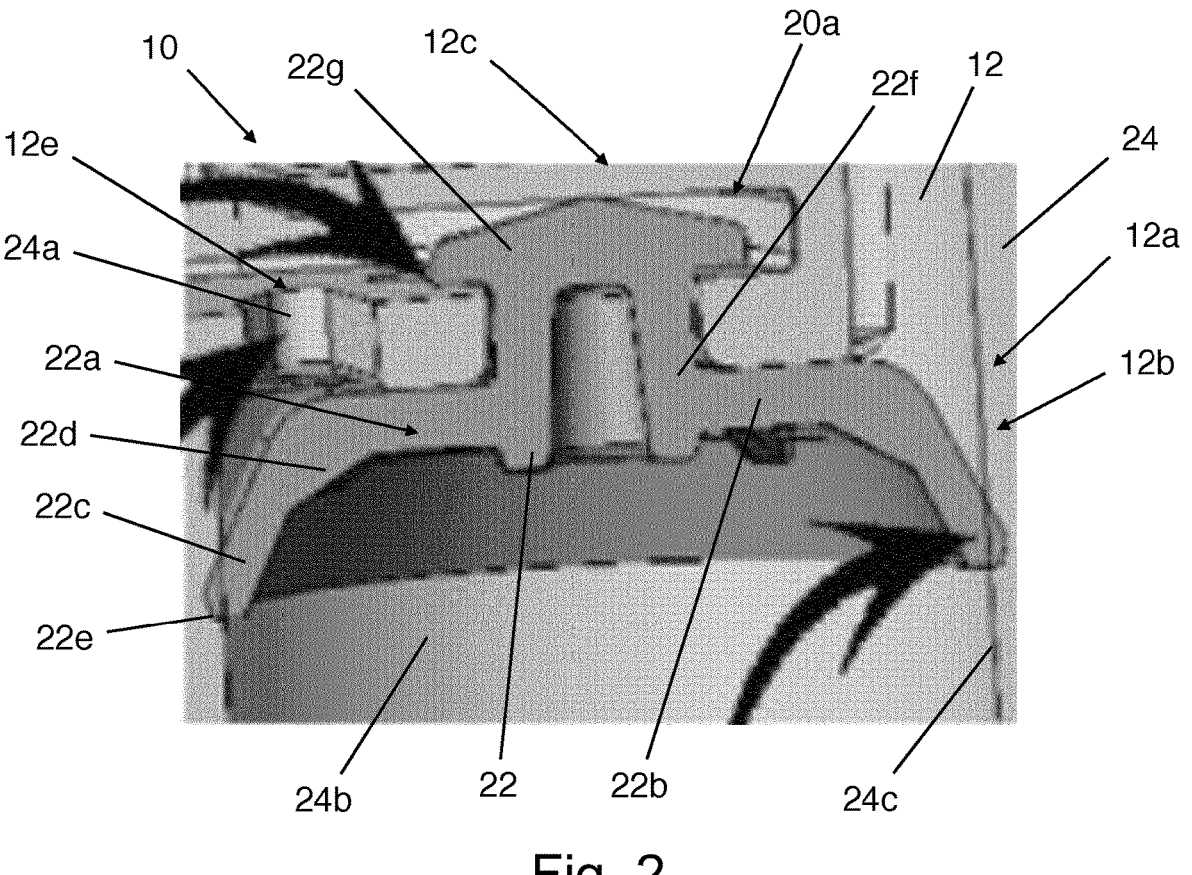
FIG. 2 is a schematic sectional view of an embodiment of a control valve according to the invention of the air dryer device according to FIG. 1.

FIG. 2 shows a schematic sectional view of an embodiment of a check valve 20a, 20b, 20c according to the invention of the air dryer device 10 according to FIG. 1.

According to FIG. 2, the first check valve 20a is exemplarily shown, wherein the following structural and functional description of the first check valve 20a and its associated technical teachings do also apply for the second and third check valve 20b, 20c according to FIG. 1.

Consequently, the second and third check valve 20b, 20c are formed in the same manner as the first check valve 20a, respectively.

According to FIG. 2, the first check valve 20a comprises by a valve body 22.

The valve body 22 is formed as an elastic integral valve body.

Especially, the valve body 22 may be formed as an elastic integral rubber valve body.

The first check valve 20a is also formed by a valve housing portion 24 that is integrally formed with the housing socket 12a of the air dryer housing 12.

The housing portion 24 comprises a valve inlet 24a that is connected to the regeneration conduit device 12e.

Accordingly, the housing portion 24 comprises a valve outlet 24b that is connected to the second connection device 18.

The housing portion 24 is formed as a circular hollow cylinder and protrudes from the housing socket 12a in a direction opposite to the desiccant container 14 (see FIG. 1).

The housing portion 24 further comprises a centrally arranged mounting region for fixing the valve body 22 inside the housing portion 24.

An inner surface 24c of the housing portion 24 is formed as circular cylindric sealing face.

The valve body 22 comprises a membrane portion 22a divided into an even inner portion 22b and an inclined outer portion 22c.

At a transition portion 22d between the even inner portion 22b and the inclined outer portion 22c, there is arranged an inclined stiffening portion with a bigger cross section.

At the radial outermost face of the inclined outer portion 22c, a radial sealing lip 22e is arranged which stays, in the mounted state, in sealed contact with the inner surface 24c of the housing portion 24.

Alternatively or additionally, the valve body 22 may comprise an axial sealing portion (not shown).

It is also conceivable that the axial sealing portion is integrated into the radial sealing lip 22e.

Alternatively, the axial sealing portion may be formed as an individual portion of the valve body 22.

The valve body 22 further comprises an elastically compressible and expandable fixing portion 22f that is formed as a hollow cylindric fixing pin.

The valve body 22 also comprises axial inner fixing faces staying in contact with corresponding wall faces of the mounting region.

The axial inner fixing faces are formed by the even inner portion 22b of the valve body 22 and a fixing cap 22g that is arranged at an axial end of the fixing pin being opposite to the even inner portion 22b of the valve body 22.

The fixing cap 22g further comprises two lead-in chamfers in order to mount the valve body properly and merely by pushing it into the mounting hole of the mounting region in a mounting direction at which the two lead-in chamfers are in front.

The arrows and/or arrow parts according to FIG. 2 that are not associated with a reference sign do not have any contribution to the subject-matter of the air dryer device 10 and the air treatment device according to the present invention, respectively.

REFERENCE SIGNS

10 air dryer device
12 air dryer housing
12a housing socket
12b bottom region
12c circular housing plate
12d radially symmetrically orientated rip sections
12e regeneration conduit device
14 desiccant container
16 first connection device
16a central circular hollow cylinder
18 second connection device
18a housing connection portion
20 first control valve
20a first check valve
20b second check valve
20c third check valve
22 valve body
22a membrane portion
22b even inner portion
22c inclined outer portion
22d transition portion
22e radial sealing lip
22f compressible and expandable fixing portion
22g fixing cap
24 valve housing portion
24a valve inlet
24b valve outlet
24c inner surface

The invention claimed is:

1. An air dryer device for an air treatment device of a utility vehicle, comprising:

at least one housing forming at least one accommodation chamber for accommodating at least one desiccant container, wherein the housing comprises:

at least one housing socket arranged, in a mounted state, at a bottom region of the housing, at least one first connection device and at least one second connection device, wherein the first and second connection devices, via the desiccant container, are connectable during at least one load phase and/or during at least one regeneration phase of the air dryer device, the second connection device being formed by a housing connection portion that is arranged radially around the first connection device;

at least one regeneration conduit for connecting the first connection device with the second connection device during the regeneration phase; and at least one first control valve arranged and configured for opening or closing the regeneration conduit, wherein
the first control valve is formed by at least one first check valve,
the first check valve is formed by at least one valve housing portion of the housing and by at least one valve body of the first check valve,
the valve body is formed as an integral elastic valve body, and
the at least one valve housing portion protrudes from the at least one housing socket in a direction opposite to the desiccant container.

2. The air dryer device according to claim 1, wherein the housing further comprises:

at least one second check valve arranged and configured for opening or closing the regeneration conduit.

3. The air dryer device according to claim 2, wherein the housing further comprises:

at least one third check valve arranged and configured for opening or closing the regeneration conduit.

4. The air dryer device according to claim 3, wherein the first check valve, the second check valve and/or the third check valve are arranged at the housing socket.

5. The air dryer device according to claim 1, wherein the first check valve, a second check valve and/or a third check valve are arranged at the housing socket.

6. The air dryer device according to claim 2, wherein the first check valve, the second check valve and/or a third check valve are arranged at the housing socket.

7. The air dryer device according to claim 4, wherein the first check valve, the second check valve, and the third check valve are radially symmetrically or radially asymmetrically arranged with regard to a longitudinal axis of the air dryer device.

8. The air dryer device according to claim 1, wherein the valve body comprises at least one membrane portion with at least one radial sealing lip and/or comprises at least one axial sealing portion.

9. The air dryer device according to claim 1, wherein the valve body comprises at least one elastically compressible and expandable fixing portion.

10. The air dryer device according to claim 2, wherein the second check valve is formed in the same manner as the first check valve.

11. The air dryer device according to claim 3, wherein the third check valve is formed in the same manner as the first check valve.

12. The air dryer device according to claim 1, wherein the air dryer device is formed as an air dryer cartridge.

13. An air treatment device for a vehicle comprising at least one air dryer device according to claim 1.

\* \* \* \* \*